United States Patent [19]

Fohey

[11] 4,456,829
[45] Jun. 26, 1984

[54] NON-CONTACT SENSOR, SYSTEM AND METHOD WITH PARTICULAR UTILITY FOR MEASUREMENT OF ROAD PROFILE

[75] Inventor: Donald R. Fohey, Plymouth, Mich.

[73] Assignee: K. J. Law Engineers, Inc., Farmington Hills, Mich.

[21] Appl. No.: 316,350

[22] Filed: Oct. 29, 1981

[51] Int. Cl.³ .............................................. G01N 21/86
[52] U.S. Cl. ........................................ 250/560; 356/1; 250/235; 180/169
[58] Field of Search ................................ 180/167–169; 356/1, 2, 4, 376; 250/234, 235, 236, 560; 350/6.7, 6.8

[56] References Cited

U.S. PATENT DOCUMENTS 3,856,399 12/1974 Hosoe et al. ............................. 356/1
3,970,845 7/1976 Hollis et al. ........................... 250/236
4,136,949 1/1979 Hayamizu et al. .................... 250/560

Primary Examiner—David C. Nelms
Assistant Examiner—J. Brophy
Attorney, Agent, or Firm—Barnes, Kisselle, Raisch, Choate, Whittemore & Hulbert

[57] ABSTRACT

Electro-optical apparatus, system and method for measuring distance to a relatively moving surface, such as distance to a road surface from a vehicle frame of reference passing thereover. The apparatus includes a light transmitter for projecting a rectangular beam vertically downwardly onto the road surface. A rotating scanner includes a circumferential array of facets for sequentially receiving the image diffusely reflected from the road surface and reflecting such image through a rectangular reticle onto a photodetector. Reference beams are sequentially reflected by the road image-reflecting scanner facets onto a reference detector. Distance to the road surface is then determined as a function of the angle of incidence of the road image onto the scanner by comparing the time of incidence of the road image to the times of occurrence of the reference reflections on the reference detector.

18 Claims, 15 Drawing Figures

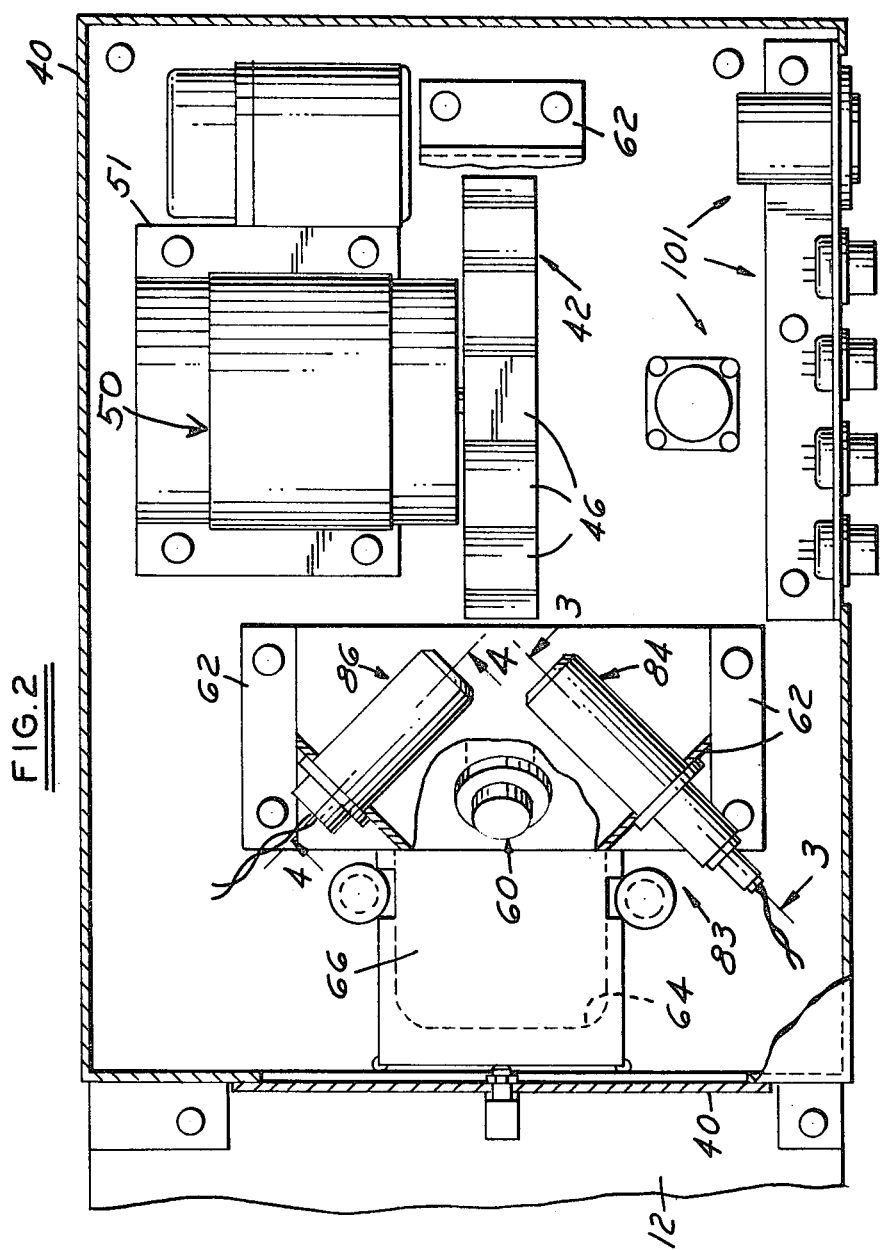

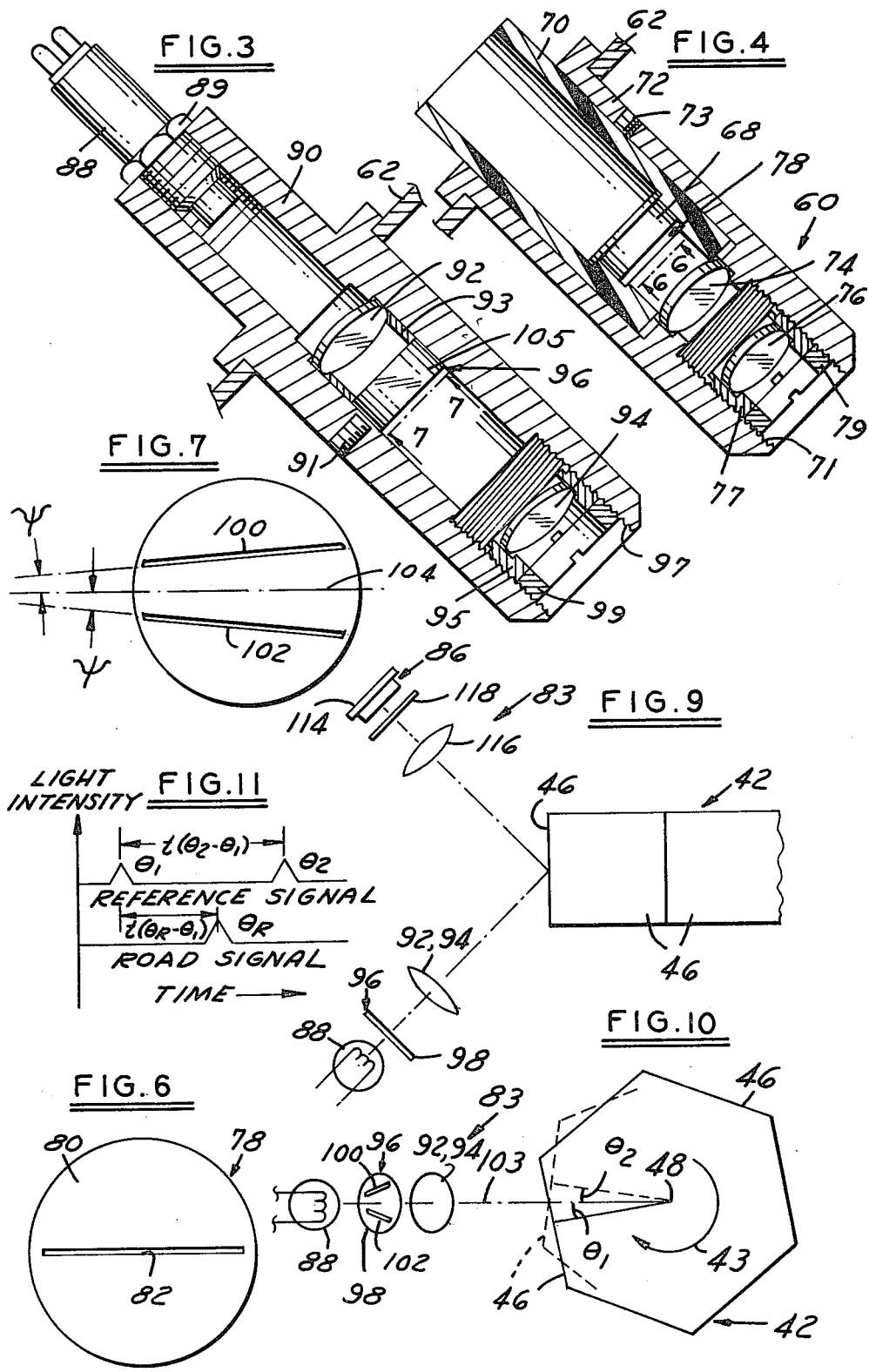

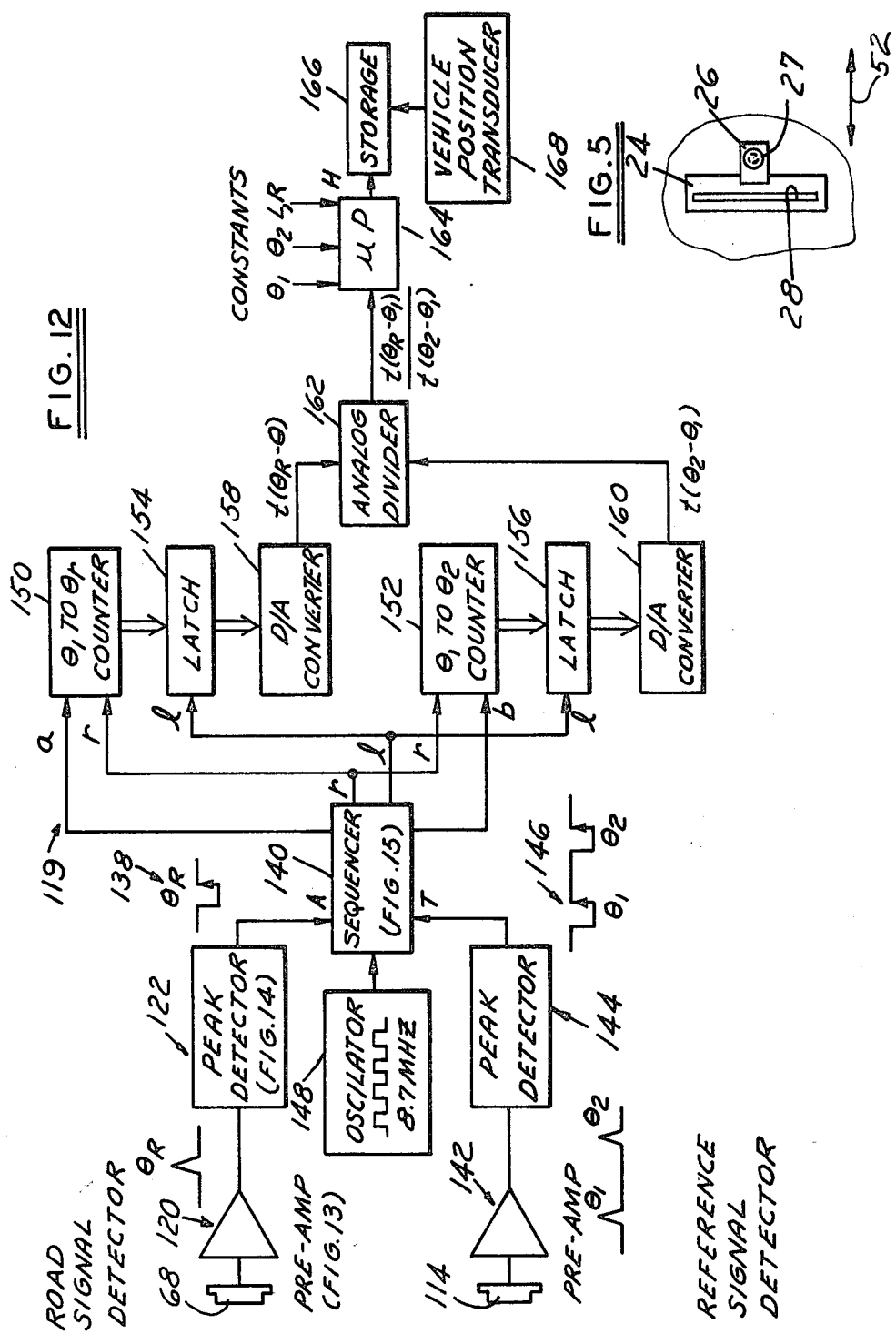

NON-CONTACT SENSOR, SYSTEM AND METHOD WITH PARTICULAR UTILITY FOR MEASUREMENT OF ROAD PROFILE

The present invention relates to distance measuring apparatus and methods, and more specifically to non-contact methods and systems for measuring surface profile. Yet more specifically, the invention relates to an apparatus, system and method for measuring the distance from a vehicle frame of reference to a road surface beneath the vehicle as the vehicle is driven over the road surface at normal traffic speeds.

BACKGROUND AND OBJECTS OF THE INVENTION

As applied specifically to measurement of road surface profile, a variety of transducers or sensors have heretofore been proposed for measuring the distance between the road surface and a vehicle frame of reference driven thereover. For example, Spangler et al U.S. Pat. No. 3,266,302 employs a potentiometer carried by a trailer and responsive to movement of the trailer suspension system with respect to the trailer frame as the trailer is drawn over the road surface in question. This distance signal is combined in Spangler et al with the twice-integrated output of an accelerometer carried by the trailer for providing an overall measurement of road profile. Non-contact sensors, such as ultrasonic sensors, have been proposed for replacement of the potentiometer in the basic Spangler et al system, but have not appreciably improved the reliability and accuracy of the frame-surface distance measurement.

One important object of the present invention, therefore, is to provide a non-contact sensing apparatus, system and method which finds particular utility in the measurement of road profile, and which is adapted for improved reliability and accuracy as compared with comparable systems and methods of the prior art.

A more general object of the invention is to provide non-contact distance measuring apparatus, systems and/or methods which embody improved economy, reliability and accuracy in assembly and use. In furtherance of the foregoing, a more specific object of the invention is to provide an improved electro-optical scanner and system for measuring the profile of a relatively moving surface.

SUMMARY OF THE INVENTION

Briefly stated, the apparatus in accordance with the invention comprises a light source and projection system for focusing a rectangular light beam onto a road surface beneath a moving vehicle. An optical receiver is spaced from the light source on the vehicle and receives an image of the rectangular beam diffusely reflected from the road surface. The optical receiver is coupled to electronics for effectively measuring the distance between the vehicle frame of reference and the road surface as a function of angle of incidence of the reflected beam onto the receiver.

The optical receiver includes a rotating scanner comprising a plurality of plane reflective surfaces mounted in a circumferential array around the scanner axis of rotation. As the scanner rotates, each reflective surface in turn deflects the road image through a reticle onto a photodetector. Thus, the angle of incidence of the reflected road image may be effectively determined as a function of the angle of rotation of the scanner at the moment at which the road image is reflected onto the photodetector.

To affect the latter determination, the optical receiver further includes a reference system comprising an optical transmitter and photodetector disposed in respective fixed positions on opposite sides of the scanner plane of rotation. The reference transmitter projects a pair of rectangular beams onto each facet of the scanner in turn as the scanner rotates. Each scanner facet reflects the reference beams successively through a reticle onto the reference photodetector. The reference beams so reflected establish a measurement window corresponding to respective angular positions of the scanner and within which the road image is received. The distance between the vehicle frame of reference and the road surface is then determined for each reflected road image as a function of the time-position of the detected road image within the measurement window. Most preferably, the reference beams are directed onto the same scanner facet as will reflect the road image within the corresponding measurement window.

In accordance with a particularly important feature of the apparatus of the invention previously described, the reticle through which the road image is reflected and focused onto the corresponding photodetector is dimensioned to be identical to or congruent with the focused and reflected road image at the effective midpoint of the measurement window. Likewise, the reticle through which the reference beams are reflected and focused onto the reference photodetector is dimensioned to be congruent with the incoming reference beams. The nominal photodetector output for each beam therefore is the convolution integral of each rectangular beam image and corresponding reticle, having the waveform of an isosceles triangle. Peak detectors are employed for reliable detection of the times of occurrence of each waveform.

The system of the invention includes process circuitry for receiving signals from the photodetectors indicative of the road and reference image, determining the temporal relationship therebetween—i.e. the time-position of the road image within the reference measurement window—and calculating distance to the road surface. The distance measurement may be fed to a storage device such as strip chart recorder or an electronic memory strobed or advanced by a signal from a wheel transducer or the like as a function of vehicle travel. Alternatively, the distance between the vehicle frame of reference and the road surface may be employed for real time determination of road profile as the signal "W-Y" in the system disclosed, for example, in the above-referenced Spangler et al patent.

BRIEF DESCRIPTION OF THE DRAWINGS

Details of the preferred embodiments of the invention, together with additional objects, features and advantages thereof, will be best understood from the following description, the appended claims and the accompanying drawings in which:

FIG. 2 is a fragmentary sectional view taken substantially along the line 2—2 in FIG. 1;

FIGS. 3 and 4 are sectional views taken substantially along the respective lines 3—3 and 4—4 in FIG. 2;

FIG. 5 is a fragmentary plan view of a portion of the apparatus of FIG. 1 taken substantially from the direction 5—5 in FIG. 1;

FIGS. 6 and 7 are elevational views taken substantially from the directions 6—6 and 7—7 in FIGS. 3 and 4 respectively;

FIGS. 9 and 10 respectively are plan and elevational schematic diagrams of the reference optics portion of the apparatus of FIGS. 1 and 2 useful in understanding details of structure and operation thereof;

FIG. 11 is a timing diagram useful in understanding operation of the invention;

FIG. 12 is a functional block diagram of a presently preferred embodiment of the electronic portion of the apparatus and system in accordance with the invention;

DETAILED DESCRIPTION OF THE PREFERRED EMBODIMENTS

Figure 1:
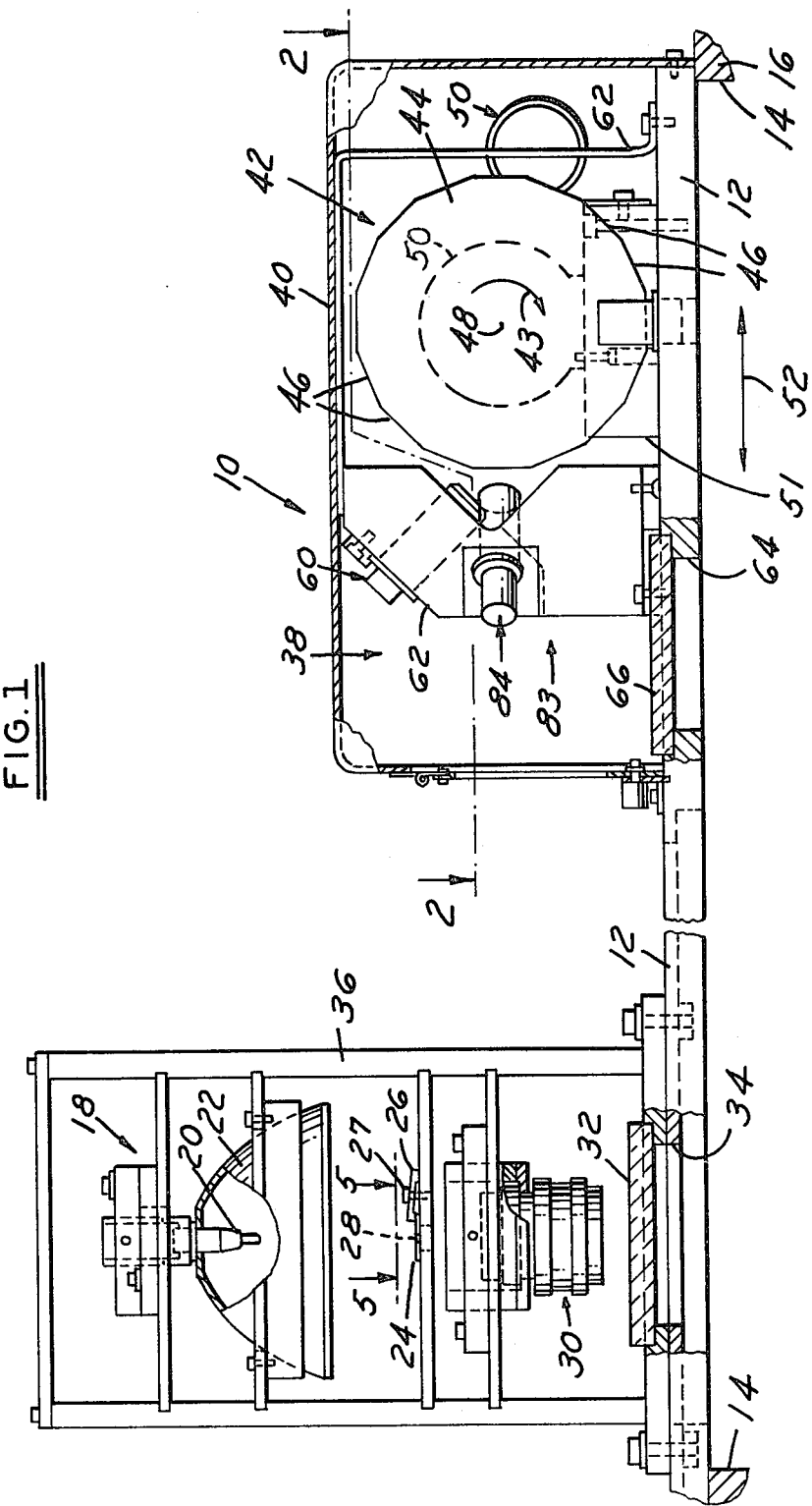
FIG. 1 is a fragmentary, partially sectioned, elevational view of a presently preferred embodiment of the apparatus in accordance with the invention.

Referring to the drawings, and particularly FIGS. 1–7, a presently preferred embodiment of the apparatus 10 in accordance with the invention illustrated therein comprises a base plate 12 (FIGS. 1 and 2) which is adapted to span an opening 14 in a vehicle frame 16 and to be rigidly affixed thereto (by means not shown) so that the vehicle frame will effectively constitute a reference (hereinafter termed the "frame of reference") in connection with which all measurements are taken. The vehicle of which frame 16 is illustrated fragmentarily in FIG. 1 may comprise a separate towed vehicle or, more preferably, a special purpose truck or van in the floor of which opening 14 is formed so as to adapt the van for measuring road profile in accordance with the invention. Although the invention will be described in connection with a presently preferred application thereof in the field of road surface profile measurement, it will be appreciated that the principles of the invention in their broadest aspects may find application in other fields where it is desired to measure the distance to or profile of a surface which moves relative to another frame of reference.

A first light source 18 (FIG. 1) is mounted on base plate 12 and includes an incandescent lamp 20 carried within a downwardly directed concave reflector 22. A plate 24 (FIGS. 1 and 5) is mounted beneath reflector 22 by the clamp 26 and screw 27, and has an elongated central rectangular opening or slot 28. A focusing lens assembly 30 is mounted beneath slotted plate 24 coaxially with reflector 22 for projecting that portion of the light beam received from lamp 20 and slot 28 through a glass plate 32 and an opening 34 in base plate 12 onto the road surface. Lamp 20, reflector 22, slotted plate 24, lens assembly 30 and glass plate 32 are all mounted in fixed position on a rack 36 and affixed as a subassembly to base plate 12. Lens assembly 30 is adjustable in the usual manner for focusing the rectangular road-illuminating beam onto the road surface as will be described. Lamp 20 is connected to a source of energizing power by means not shown.

An optical receiver 38 (FIGS. 1 and 2) is carried by base plate 12 within a sealed enclosure 40. Receiver 38 includes an optical scanner 42 which comprises a wheel 44 on which is mounted a peripheral and circumferential array of plane reflective surfaces or mirror facets 46. Wheel 44 is rotated continuously in operation about its central axis 48 by the motor drive mechanism 50. Scanner 42 is mounted to base plate 12 by the bracket 51 so as to locate scanner axis of rotation 48 in fixed position (following initial set-up) spaced from the axis of the road-illuminating beam, perpendicular to the direction of such spacing and parallel to the longitudinal dimension of slot 28. In a preferred embodiment of the invention, scanner 42, including wheel 44 and motor 50, comprises a model 1816 POLYSCAN Scanner Assembly marketed by Scanco Inc. of South Norwalk, Conn., having 16 facets or reflecting surfaces 46 mounted in a circumferential array around the wheel periphery, with the plane of each reflecting facet being tangential to wheel axis 48. The scanner wheel rotates at 1800 RPM.

A glass plate 66 (FIG. 1) spans an opening 64 in baseplate 12 for admitting a portion of the illuminating beam diffusely reflected by the road surface. An optical receiver assembly 60 (FIGS. 1, 2 and 4) is mounted by a bracket 62 with the receiver axis lying in the central plane of rotation of scanner 42 for receiving successive road image beams as reflected in turn by scanner facets 46. As best seen in FIG. 4 (and schematically in FIG. 8), receiver assembly 60 includes a photodetector 68 mounted on an insulating sleeve 70 which is held within a detector housing 72 by the set screw 73. A first focusing lens 74 is captured by sleeve 70 against an opposing shoulder 75 within housing 72. A second focusing lens 76 is adjustably carried by a sleeve 77 within the threaded bore 71 of housing 72 and is held therein in adjusted position by the threaded jam ring 79.

A mask or reticle 78 (FIGS. 4 and 6, and schematically in FIG. 8) is positioned between lens 74 and photodetector 68, and comprises an opaque disc 80 having a rectangular transparent region 82 extending diametrically thereacross. The longitudinal dimension of open region 82, which may also be termed a "slot" in the optical sense, is parallel to the longitudinal dimension of slot 28 in plate 24 (FIG. 1). Preferably, reticle 78 comprises a photolithographically reproduced mask adhered to the face of detector 68. Reticle "slot" 82 is dimensioned to be congruent with the road image at the focal distance of lens assembly 30 (FIG. 1) as reflected by scanner facets 46 and focused by lenses 74,76. Detector 68, which is shown schematically in FIG. 13, preferably comprises a silicon diffused guard ring photodiode.

Figure 8:
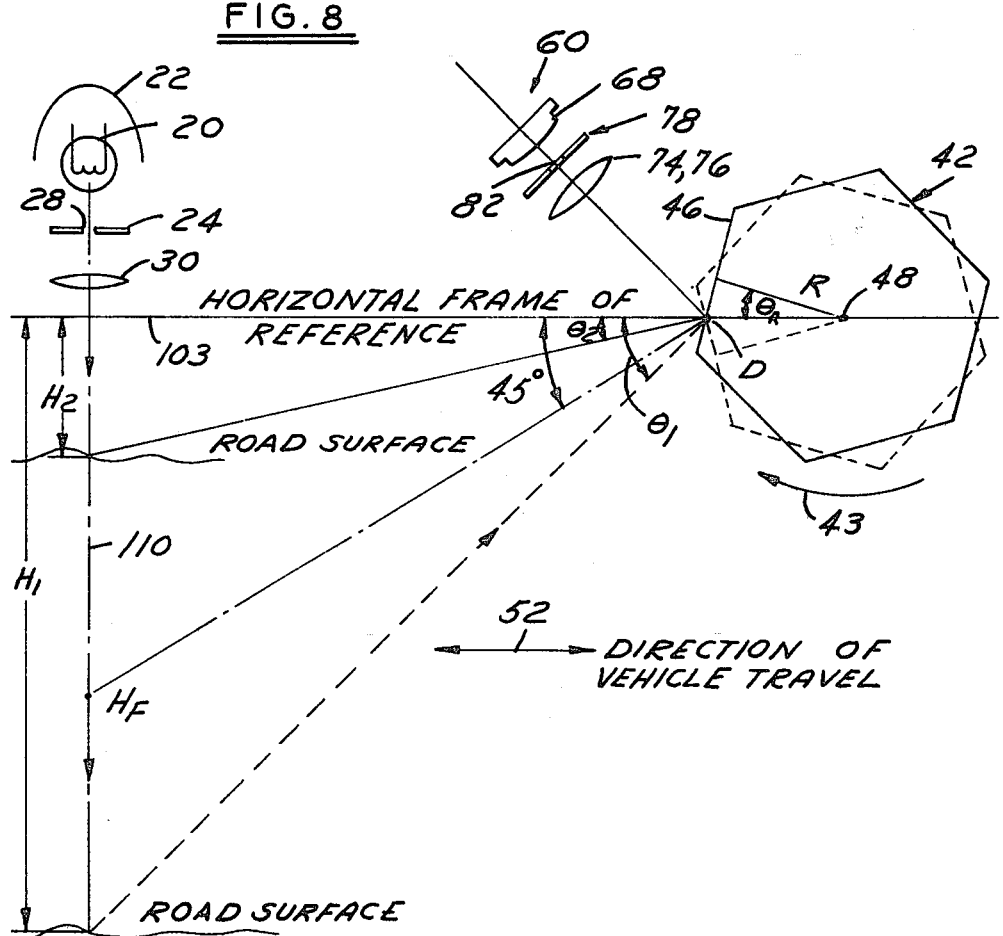
FIG. 8 is a schematic diagram of the road image optics portion of the apparatus of FIGS. 1 and 2 useful in understanding details of structure and operation thereof.

A reference optical system 83 (FIGS. 1–3 and 7, and schematically in FIGS. 9–10) is carried within enclosure 40 by bracket 62. Reference system 83 comprises an optical transmitter assembly 84 and a receiver assembly 86 disposed in fixed complementary positions on opposite sides of the plane of rotation of scanner 42 (as best seen in FIGS. 2 and 9) and with respective axes in reference plane 103 (FIGS. 8 and 10). Transmitter assembly 84 comprises a lamp 88 (FIG. 3) mounted by a jam nut 89 within the threaded end of a hollow housing 90. A reference mask 96 is held within housing 90 by the set screw 91 and cooperates with a sleeve 93 to capture a first focusing lens 92 against an opposing internal housing shoulder. A second focusing lens 94 is adjustably carried by a sleeve 95 within the threaded bore 97 and is held therein in adjusted position by the threaded jam ring 99. Power is applied to the various motor and optic elements, and signals are fed therefrom to external electronics (FIG. 12) through the array of connectors 101 in FIG. 2.

Mask 96 comprises an opaque disc 98 (FIG. 7 and schematically in FIGS. 9–10) having a pair of transparent rectangular regions 100,102 extending transversely thereacross at opposite angles psi (FIG. 7) with respect to the disc diameter 104. Disc 98 is photolithographically produced and adhered onto a cylindrical glass substrate 105 (FIG. 3). The purpose of the paired slots 100,102 and the angles psi will be discussed hereinafter. Reference receiver assembly 86 is identical to road image receiver assembly 60 previously discussed. The reference receiver photodetector, mask and focusing lenses are illustrated schematically at 114,116,118 in FIG. 9. The axes of the reference receiver and transmitter assemblies, the longitudinal dimension of the transparent region in mask 118 and the diameter 104 of mask 96 are all coplanar at 103 (FIGS. 8 and 10) with scanner axis 48.

Operation of the optical portion of the apparatus to the extent thus far described, as well as additional structural details thereof, will be discussed in connection with FIGS. 8–11 of the drawings. In FIG. 8, which is a schematic diagram of the road imaging optics, and in FIGS. 9–10, which are schematic diagrams of the reference optics, the schematic representations of optical elements previously described are identified by correspondingly identical reference numerals. Turning first to FIG. 8, lamp 20 and reflector 22 cooperate with slot 28 and lens assembly 30 to project a road illuminating beam on the axis 110 vertically downwardly from the vehicle frame of reference onto the road surface. As will be described hereinafter, the road image and reference optics cooperate to measure distance between the frame of reference, which is a horizontal line or plane 103 (FIG. 8) passing through the scanner axis 48, and the road surface between maximum and minimum limits $H_1$ and $H_2$. Preferably, illumination lens assembly 30, which may comprise a 50 mm Vivitar camera lens having an aperture adjustable from f16 to f2.0, is adjusted to focus the illumination at a distance $H_F$ midway between limits $H_1,H_2$. The illumination pattern at the road surface is a rectangle, having a longer dimension laterally of the direction of vehicle travel 52 (FIGS. 1, 5 and 8) and a shorter dimension in the direction of travel.

A portion of the illumination beam is diffusely reflected by the road surface toward scanner 42, and is thence reflected in turn by each scanner facet 46 onto detector 68 as previously described. Preferably, the longitudinal distance L between beam axis 110 and the image-reflecting facet at the point of perpendicularity with the frame of reference, i.e. point D, is adjusted so that the angle of incidence of a road image from focal distance $H_F$ to point D is 45°.

In the arrangement of FIG. 8, an unknown distance H to be measured between the frame of reference and the road surface is given by the equation:

$$H = \left[ L + R\left(1 - \frac{1}{\cos\theta_R}\right)\left(1 + \frac{1}{\sin\left(\frac{\pi}{4} + 2\theta_R\right)}\right)\right] \tan\left(\frac{\pi}{4} + 2\theta_R\right) \tag{1}$$

where L is the distance from axis 110 to point D, R is the radius of scanner 42 measured perpendicular to the planes of facets 46, and theta-R is the angle of such radius at the image-reflecting facet to reference plane 103 at the time of incidence of the road image onto photodetector 68. L and R are constants, so that the distance H to the road surface may be measured as a function of angle of incidence by determining the angle theta-R of the reflecting scanner facet at the time of incidence.

Turning to FIGS. 9 and 10, reference optical system 83 cooperates with the facets of scanner 42, specifically the particular facet 46 which is moving into position for road image reflection, to define a measurement window within which the road image signal is received. More specifically, two rectangular reference beams are projected from lamp 88 through reticles or "slots" 100,102 and lenses 92,94 onto each facet in turn as scanner 42 rotates. With scanner 42 rotating in the direction 43 (FIGS. 1 and 10), the rectangular reference beam through slot 102 will be incident on reference detector 114 when the reflecting facet 46 is at an angle theta-1 with reference plane 103, which angle corresponds to the maximum measurable height $H_1$ (FIG. 8). The rectangular reference beam through slot 100 is next incident on detector 114 when the reflecting facet 46 is at angle theta-2 (phantom in FIG. 10) to plane 103, which angle corresponds to the minimum height $H_2$ (FIG. 8).

As previously described, the reticle in mask 118 at reference detector 114 is horizontal. To insure that the rectangular reference beams incident thereon are also horizontal, and thereby achieve the convolution integration feature previously described, the slots 100,102 in mask 96 must be angulated with respect to the horizontal. The angles psi (FIG. 7) of each slot 100,102 on opposite sides of the horizontal diameter 104 are given by the equation:

$$\psi = \tan^{-1}\left[\frac{\cos\left(\frac{\pi}{4} - \alpha\right)\tan 2\theta}{\cos\left(\frac{\pi}{4} - \alpha\right)}\right] \tag{2}$$

where theta is either theta-1 or theta-2 (which are equal to each other in this configuration) for the desired maximum and minimum heights respectively (FIG. 8), and alpha is given by the equation:

$$\alpha = \tan^{-1}(1 - 2\sin\theta\sin\theta). \tag{3}$$

Thus, two reference signals are successively incident on reference detector 114 as each scanner facet 46 passes the reference optics. Because the image of each reference slot 100,102 seen at detector reticle 118 is congruent therewith, passing of the reflected image across the detector reticle performs a convolution integration operation which yields a waveform at the detector output in the form of an isosceles triangle. These successive reference signals are illustrated at theta-1 and theta-2 in FIG. 11, and are separated in time by an amount corresponding to the available measurement window. The road image theta-R (FIG. 11) is received at detector 68 (FIG. 8) during this time. Theta-R, the unknown in equation (1), is given by the equation:

$$\theta_R = \theta_1 + (\theta_2 - \theta_1) \frac{t(\theta_R - \theta_1)}{t(\theta_2 - \theta_1)} \quad (4)$$

where theta-1 and theta-2 are constants as previously described, $t(\theta_2-\theta_1)$ is the time interval between the theta-1 and theta 2 reference pulses, and $t(\theta_R-\theta_1)$ is the time interval between the first reference pulse and the road image. These time intervals are illustrated in FIG. 11.

Figure 13:
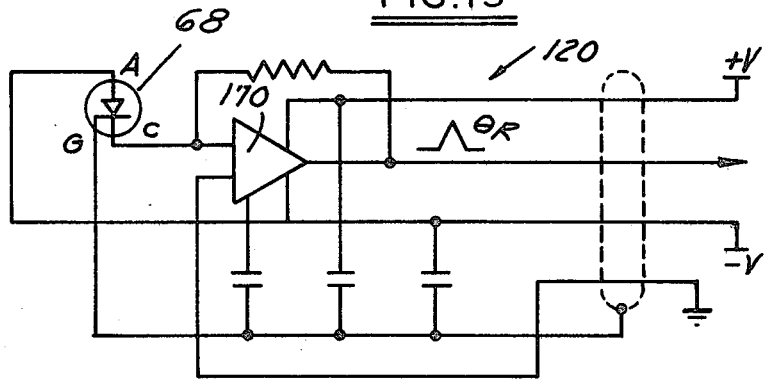
FIGS. 13 and 14 are respective electrical schematic diagrams of the preamplifier 120 and the peak detector 122 in FIG. 12.
Figure 14:
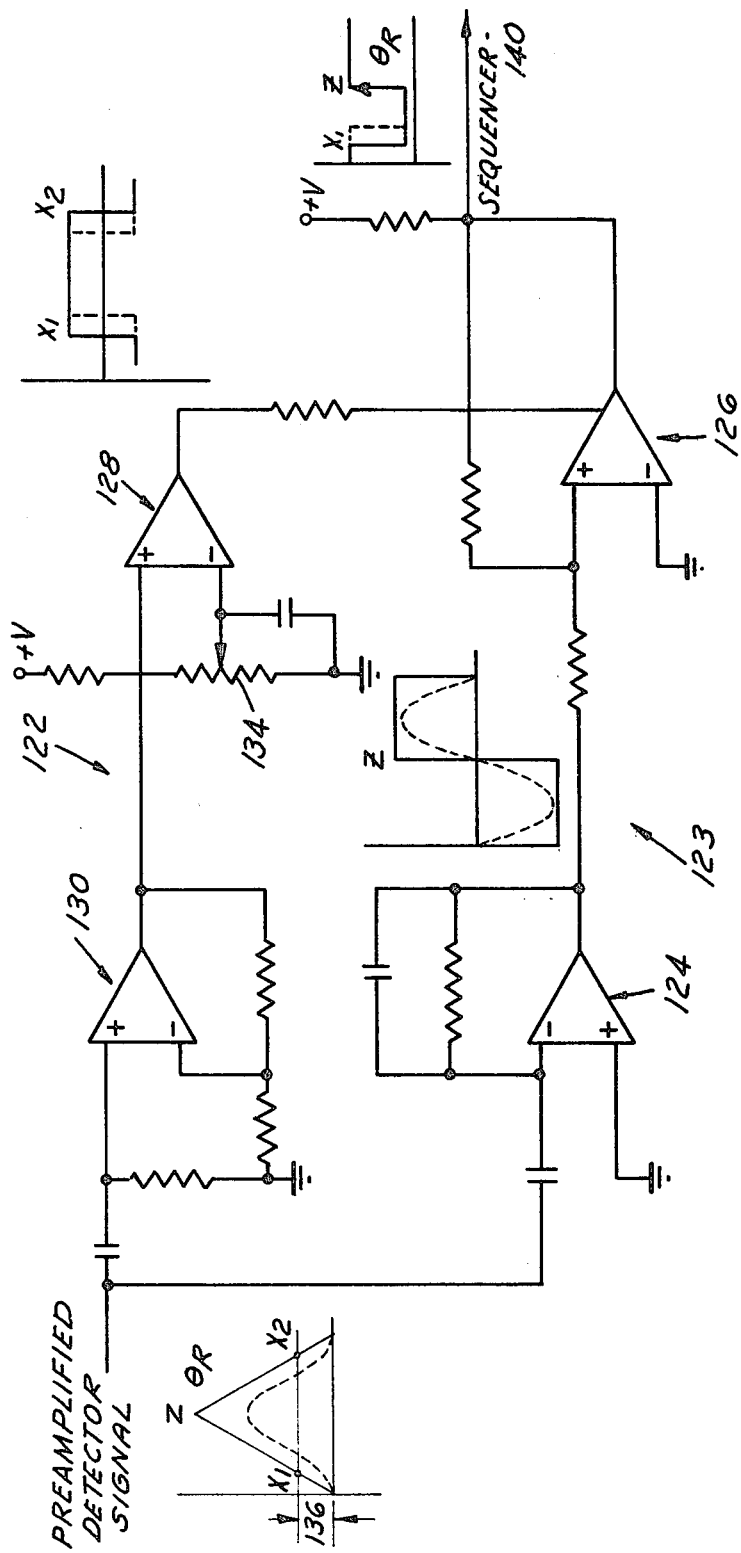
Figure 15:
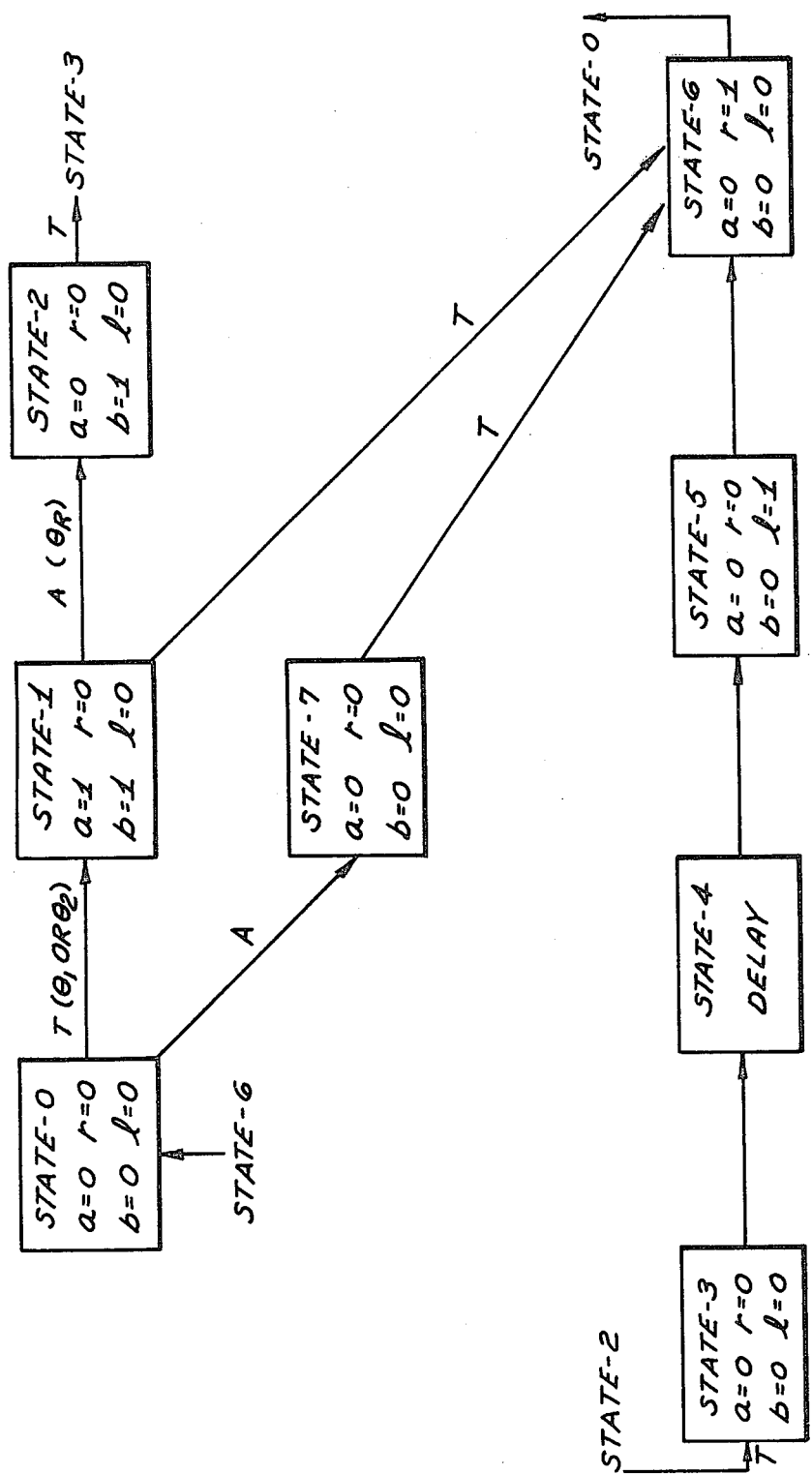
FIG. 15 is a state diagram which illustrates operation of the sequencer 140 in FIG. 12.

FIG. 12 illustrates a presently preferred embodiment of an electronic system 119 for measuring road surface distance H per equation (1) as a function of time intervals $t(\theta_2-\theta_1)$ and $t(\theta_R-\theta_1)$, and FIGS. 13–15 illustrate various details of system 119. Road image detector 68 is connected in FIG. 12 through a preamplifier 120 (to be described in detail in connection with FIG. 13) and a peak detector 122 to provide an input A to a sequence controller or sequencer 140 upon occurrence of the peak or tip of the road image theta-R (FIGS. 11 and 12) signal. Likewise, reference detector 114 is connected through a preamplifier 142 and a peak detector 144 to provide an input T to sequencer 140 at the peak of each of the theta-1 and theta-2 reference signals. Sequencer 140 receives a clock input from an 8.7 MHz oscillator 148 which, in the optics configuration thus far described, provides a resolution of 0.0015 inches.

As will be described in greater detail hereinafter, sequencer 140 operates to provide an output r to reset a pair of digital counters 150,152. Sequencer 140 thereafter provides a clocked output a to the counting input of counter 150 from the time of occurrence of the theta-1 signal to the theta-R signal. Likewise, sequencer 140 provides a clocked output b to counter 152 between the theta-1 and theta-2 signals. Thus, upon occurrence of the theta-2 signal, counters 150,152 have counts therein respectively indicative of $t(\theta_R-\theta_1)$ and $t(\theta_2-\theta_1)$. These counts are loaded into respective latches 154,156 under control of a latch signal 1 from sequencer 140. The latch outputs are connected through respective digital-to-analog converters 158,160 to an analog divider 162 which provides an output indicative of the time-fraction in equation (4). A microprocessor 164 receives the output of divider 162, signals indicative of constants $\theta_1, \theta_2$, L and R, and computes H per equations (4) and (1). The road distance signal H is then fed to a suitable storage device 166, such as a memory device or a strip chart recorder, which receives a strobe input signal from a suitable vehicle position transducer 168, such as a code disc at a selected vehicle wheel.

Referring now to FIG. 13, preamplifier 120 shown in block form in FIG. 12 comprises an operational amplifier 170 connected as shown to road image photodetector 68 so as to receive therefrom an electrical input signal as a function of total light incident thereon. As previously described, an important feature of the invention lies in the provision of a reticle at the detector which is congruent with the road image focused thereon. Thus, as the rectangular road image scans the rectangular detector reticle as scanner 42 rotates, the output of detector 68 and amplifier 120 takes the form of an isosceles triangle illustrated at theta-R. Reference preamplifier 142 (FIG. 12) is identical to preamplifier 120 (FIGS. 12 and 13).

FIG. 14 illustrates details of peak detector 122 shown in block form in FIG. 12, and also illustrates voltage/-time waveforms that appear at various points of the detector circuitry. Peak detector 122 includes a zero crossing detector 123 which comprises a differentiator 124 receiving an input from preamplifier 120, and a gate 126 which directs the output of differentiator 124 to sequencer 140 (FIG. 12). Gate 126 receives an enabling input from a threshold detector 128 which is connected to preamplifier 120 by the amplifier 130.

In operation of peak detector 122, the output of differentiator 124 switches from a low to a high state as the slope of the triangular input theta-R switches from positive to negative, i.e. at the time Z of the signal peak. To avoid ambiguity, the differentiator output is gated to sequencer 140 (FIG. 12) only when threshold detector 128 indicates occurrence of a detector output. That is, detector 128 receives a minimum threshold signal, corresponding to voltage level 136, from a factory-set variable resistor 134, and enables operation of gate 126 only during the time $X_1$ to $X_2$ when the theta-R signal exceeds this threshold. Thus, the peak detector output to sequencer 140 is normally high, switches low at time $X_1$ when the theta-R input exceeds threshold 136 and the output of differentiator 124 is still low, and then again switches high at time Z, the latter being detected by sequencer 140. At time $X_2$ when the theta-R input declines below threshold 136, the peak detector output is disenabled and remains high. Reference peak detector 144 (FIG. 12) is identical to detector 122 (FIGS. 12 and 14).

A particularly important advantage of the optical convolution and pulse detection technique in accordance with the invention will be appreciated with reference to FIG. 14. More specifically, it may be expected that less than optimum road surface quality will normally be such that the intensity of the reflected road image seen by road signal detector 68, and the electrical output therefrom, may be less than the optimum sharp triangular waveform, and thus may assume the degraded quality illustrated in phantom in FIG. 14. However, zero crossing detector 123 cooperates with threshold detector 130 in a manner illustrated in phantom identical to that previously described so as to place the one-going output at time Z from pulse detector 114 at the same time under degraded condition as would be the case with a preamplified detector input signal of optimum nominal triangular configuration.

The operating control sequence of sequencer 140 (FIG. 12) will be best understood with reference to the sequencer state diagram of FIG. 15. In particular, starting in State 0, the a, b, r and 1 outputs to counters 150,152 and latches 154,156 are at a zero or non-enabling state. Upon receipt of a T input from pulse detector 144, indicating receipt of either a theta-1 or a theta-2 reference signal, the sequencer advances to State 1 wherein the clocked a and b outputs are fed to counters 150,152 to initiate the respective counting operations therein. The r and 1 outputs remain low or off. Receipt of an A input from pulse detector 122, indicative of receipt of a road image theta-R signal, switches sequencer 140 from State 1 to State 2 wherein the a output to counter 150 is terminated for ending the counting operation therein. The b output to counter 152 is maintained high so as to continue the latter counting operation. Receipt of a second T input to the sequencer, indicative of the receipt of the theta-2 reference signal at detector 114, switches the sequencer to State 3 wherein the b output goes low and the counting operation in counter 152 is therefore terminated.

After an automatic delay in State 4, the sequencer advances to State 5 wherein the 1 output to latches 154,156 is switched on so as to store therein the counts in counters 150,152 respectively. These counts are fed to divider 162 and microprocessor 164 as previously described. In the meantime, the sequencer is automatically cycled to State 6 wherein the r output is fed to counters 150,152 for resetting the respective counters in preparation for the next operating sequence, and the sequencer is returned to State 0.

It may occur, particularly during initial startup, that a theta-R or A input to sequencer 140, indicative of receipt of a road image, will occur while the sequencer is in State 0 before receipt of a reference or T input. In such an event, the sequencer is stepped from State 0 to State 7 wherein all outputs are held low or off awaiting receipt of the first T input from the reference pulse detector. The first such T input following an A input will be indicative of receipt of the theta-2 reference signal, and will advance the sequencer to State 6 wherein the counters are reset, and then to State 0 wherein all outputs are off awaiting receipt of the next or theta-1 indicating T input signal. It is also possible following receipt of such first T input signal and advancement of the sequencer to State 1 that the next input will also be a T or reference input. Such an occurrence may take place, for example, where the road signal is lost in a crack or pavement expansion joint, or during initial startup where the first signal received is the theta-2 indicating T signal. In either event, the sequencer is automatically advanced to State 6 wherein the counters are reset, and thence to State 0 awaiting the next or theta-1 indicating T input signal.

It will thus be appreciated that there has been disclosed a distance measuring apparatus, system and method which finds particular utility in the environment of road profilometry, and which otherwise fully satisfies all of the objects and aims previously set forth. However, many alternatives, modifications and variations are contemplated. In a presently preferred embodiment of the invention, the transmission optics are adapted to focus the road illuminating beam vertically downwardly to illuminate a patch of road surface six inches long laterally of the direction of travel and 0.1 inch long in the direction of travel at focal height $H_F$ (FIG. 8). The six-inch lateral dimension approximates the width of a typical passenger car tire tread. The 0.1 inch dimension permits measurement of small variations in the direction of travel, such as cracks or expansion joints. The apparatus measures average distance to the illuminated rectangle, and the six-inch width insures that the beam will not be lost or yield a false reading due to a pebble hole or the like.

It is also possible that the illumination beam could be other than vertically directed onto the road surface. Such a modification could be advantageous under some circumstances, particularly where the angle of incidence is equal to the angle of reflection from the road, which would provide for maximum reflection to the scanner. However, this technique would complicate calculations because the illuminated road patch would move both horizontally and vertically with height, and is not preferred.

In a preferred embodiment of the invention, focal height $H_F$ is eighteen inches, and heights $H_1$ and $H_2$ are twenty-one and fifteen inches respectively. Although the road image is out of focus at the maximum and minimum measurable heights, the ability of the peak detector arrangement (FIG. 14) to tolerate substantial degredation in road image provides reliable operation. The 45° angle of incidence at scanner 42 from focal height $H_F$ is preferred because sensitivity given by the equation:

$$\frac{d\theta}{dH} = \frac{1}{H} \frac{\tan\theta}{1 + \tan^2\theta} \quad (5)$$

is maximum at this angle. Other nominal or focal angles of incidence may be used.

It will be recognized that reference source reticle 96 (FIGS. 9 and 10) and reference detector reticle 118 are interchangeable. Likewise, it will be appreciated that the reference reticle angle psi (FIG. 7) depends upon theta-1 and theta-2, which in turn depend upon desired maximum and minimum distances $H_1$ and $H_2$. In the above-described preferred embodiment, psi is equal to 4.4°. As a modification to FIG. 12, it is contemplated that latches 154,156 may be connected directly to microprocessor 164 and thereby eliminate any requirement for D/A converters 158,160, divider 162 and the requisite A/D converter at the input of microprocessor 164.

The invention claimed is:

1. Apparatus for measuring distance to a surface comprising first means for directing a light beam onto a surface to illuminate a portion of the surface; optical scanner means comprising means rotatable about an axis and a plurality of reflective facets mounted in a circumferential array about the periphery of said rotatable means, said scanner means being disposed to receive light from said first means reflected by the surface; first light responsive means mounted in fixed position with respect to said axis to receive optical images of the illuminated portion of the surface successively reflected thereon by said facets in turn for providing a surface image signal in response to incidence thereon of each said optical image; second means including reference light source means for directing light energy onto each said facet in turn as said scanner means rotates, and reference detection means disposed to receive light energy from said reference light source means reflected in turn by each said facet for providing a reference signal; and third means responsive to a temporal relationship between said image signal and said reference signal for measuring distance to the surface.

2. The apparatus set forth in claim 1 wherein said reference light source means includes means for directing first and second reference light beams onto each said facet, wherein said reference detection means including means responsive to said first and second reference light beams for providing respective first and second reference signals, and wherein said third means includes means responsive to time of occurrence of said surface image signal with respect to said first and second reference siganls.

3. The apparatus set forth in claim 2 wherein said reference light source means is positioned with respect to said scanner means and said first light responsive means to direct said reference light beams as said scanner means rotates successively onto the one of said scanner facets positioned to reflect said optical image onto said first light responsive means.

4. The apparatus set forth in claim 3 wherein said third means comprises means responsive to said first and second reference signals for establishing measurement limits, and means responsive to time of occurrence of said surface image signal within said limits to measure said distance.

5. Apparatus for measuring road surface profile as a function of distance between a road surface and a vehicle frame of reference travelling on the road surface comprising first means adapted to be mounted on a veicle for directing a continuous beam of light energy downwardly towardly a road surface; second means including light sensitive means adapted to be mounted in fixed position of the vehicle, a plurality of plane reflective means, means mounting said plurality of plane reflective means in a circumferential array wherein each said reflective means is tangetial to an axis which is fixed with respect to said frame of reference, and means for continuously rotating said mounting means and said plurality of reflective means about said axis, said first and second means cooperating to define a frame of reference onthe vehicle; and third means responsive to angular position of said reflective means for measuring thedistance between the vehicle frame of reference and the road surface, said third means comprising reference means mounted in fixed position with respect to said axis and including reference source means for directing a continuous beam of light energy sequentially onto said plurality of reflective means, and reference light energy responsive means mounted to receive first and second beams of light energy from said reference source means reflected by one of said plurality of reflectvie means at angular orientations of said reflective means respectively corresponding to first and secon angles correlated with first and second distances between said frame of reference and theroad surface.

6. The apparatus set forth in claim 5 wherein said third means comprises fourth means responsive to said light sensitive means for providing a first signal as a function of reflection of a light beam from said first means by a road surface, fifth means responsive to said reference light energy responsive means for providing second and third signals as respective functions of reflection of said first and second beams, and sixth means for providing a measure of said distance to said road surface as a function of a temporal comparison of said first, second and third signals.

7. The apparatus set forth in claim 6 wherein said first means comprises a light source, a first rectangular reticle and means for focusing a light beam passing from said light source through said reticle onto a road surface as a rectangular image having one rectangular dimension parallel to said axis, said focusing means having a focal distance.

8. The apparatus set forth in claim 7 wherein said second means further comprises a second rectangular reticle and means for focusing a light beam reflected by said road surface and said reflective means through said second rectangular reticle onto said radiation sensitive means, said second rectangular reticle being dimensioned to be congruent with a said beam reflected by a road surface at said focal distance 9. The apparatus set forth in claim 8 wherein said third means includes means responsive to angular position of said reflective means comprising reference source means for directing light energy onto said reflective means and reference energy responsive means mounted to receive light energy from said reference source means reflected by said reflective means at positions of said reflective means corresponding to said first and second angles.

10. The apparatus set forth in claim 9 wherein said reference source means comprises a reference source of light energy, first rectangular reference reticle means and means for focusing a pair of beams of light energy from said reference source through said first reference reticle means onto said reflective means, and wherein said reference energy responsive means comprises a photodetector, second reference reticle means and means for focusing said pair of light beams from said reference source and said first reference reticle means onto said photodetector in turn as a function of rotation of said reflective means.

11. The apparatus set forth in claim 8 wherein said first means including said light source, said first reticle and said focusing means are adapted to be mounted with respect to said frame of reference for directing a said light beam onto said surface from a direction perpendicular to the average plane of said surface.

12. The apparatus set forth in claim 11 wherein said focusing means is adapted to focus said light beam at a distance from said frame of reference midway between said first and second distances.

13. The apparatus set forth in claim 12 wherein said reflective means and said radiation sensitive means are disposed such that said angle of incidence onto said reflective means of a light beam reflected by a road surface at said distance is substantially 45°.

14. Apparatus for measuring distance to a surface comprising a first light source, a rectangular slit mounted in fixed position relative to said light source and means for focusing light energy from said source through said slit onto said surface to illuminate a portion of said surface, said focusing means having a focal distance from said source; reflective means mounted to oscillate about an axis, a photodetector, a rectangular reticle and means for focusing light energy from said source reflected by said portion of said surface and by said reflective means through said reticle onto said photodetector, said reticle being dimensioned to be congruent with the focused and reflected image of said portion of said surface when said surface is at said focal distance from said first source; and first means responsive to said photodetector and to said reflective means to measure distance to said surface.

15. The apparatus set forth in claim 14 wherein said first means includes means for measuring angle of incidence of light energy reflected by the surface onto said reflective means comprising a reference light source, a first reference rectangular reticle and means for focusing light energy from said reference source through said first reference reticle onto said reflective means from fixed orientation with respect to said axis; a reference photodetector, a second rectangular reference reticle and means for focusing light energy from said reference source reflected by said reflective means through said second reticle onto said reference photodetector, said second reference reticle being dimensioned to be congruent with the reflected and focused light energy from said reference source and first reticle, and means responsive to both said photodetectors for measuring distance to said surface as a function of times of incidence of light energy onto said photodetectors.

16. The apparatus set forth in claim 14 wherein said means responsive to both said photodetectors comprises first and second differentiating means respectively coupled to said photodetectors, first and second zero crossing detection means responsively coupled to said first and second differentiating means, and means responsive to said first and second zero crossing detection means for indicating said times of occurrence.

17. A system for measuring and recording road surface profile as a function of distance between successive increments of the road surface and a vehicular inertial frame of reference travelling over said road surface comprising first means adapted to be mounted in fixed position with respect to a vehicle frame for directing a measurement light beam onto the road surface beneath the frame, second means adapted to be mounted in fixed position with respect to said frame spaced from said first means in a direction parallel to the direction of travel of the vehicle over the surface and responsive to light energy from said first means reflected by the road surface, third means responsive to the angle of incidence of said reflected light energy for measuring distance from the vehicle frame and the road surface, and means adapted to be responsive to incremental displacement of the vehicle over the road surface for sampling and storing successive measurements of said distance.

18. Apparatus for measuring road surface profile as a function of distance between a road surface and a vehicle frame of reference travelling on the road surface comprising first means adapted to be mounted on a vehicle and including a light source, a first rectangular reticle and means for focusing a light beam passing from said light source through said reticle onto a road surface as a rectangular image having one rectangular dimension parallel to said axis; second means including light sensitive means adapted to be mounted in fixed position on the vehicle, reflective means spaced from said first means and adapted to oscillate about an axis which is fixed with respect to said frame of reference between at least first and second angles with respect to said frame of reference correlated with first and second distances between said frame of reference and the road surface, a second rectangular reticle and means for focusing a light beam reflected by the road surface and said reflective means through said second rectangular reticle onto said light sensitive means, said first and second means cooperating to define a frame of reference on the vehicle; and third means responsive to angular position of said reflective means and including reference source means for directing light energy onto said reflective means and reference energy responsive means mounted to receive light energy from said reference source means reflected by said reflective means at positions of said reflective means corresponding to said first and second angles for measuring the distance between the vehicle frame of reference and the road surface, said reference source means comprising a reference source of light energy, first rectangular reference reticle means and means for focusing a pair of beams of light energy from said reference source through said first reference reticle means onto said reflective means, said reference energy responsive means comprising a photodetector, second reference reticle means and means for focusing said pair of light beams from said reference source and said first reference reticle means onto said photodetector in turn as a function of rotation of said reflective means.

* * * * *